(12) United States Patent
Patlashenko et al.

(10) Patent No.: US 7,243,046 B1
(45) Date of Patent: Jul. 10, 2007

(54) SYSTEM AND METHOD FOR PREPARING TRACE DATA FOR ANALYSIS

(75) Inventors: Igor Patlashenko, Brookline, MA (US); Adnan Sahin, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/124,776

(22) Filed: May 9, 2005

(51) Int. Cl.
*G06F 11/30* (2006.01)
*G21C 17/00* (2006.01)

(52) U.S. Cl. .................................... 702/183
(58) Field of Classification Search .............. 702/182, 702/186; 714/37, 39
See application file for complete search history.

(56) References Cited

U.S. PATENT DOCUMENTS

| | | | | |
|---|---|---|---|---|
| 5,206,939 A | * | 4/1993 | Yanai et al. ............... | 711/4 |
| 5,657,223 A | * | 8/1997 | Juszczak et al. ........... | 705/400 |
| 6,101,497 A | * | 8/2000 | Ofek .......................... | 707/10 |
| 6,769,054 B1 | * | 7/2004 | Sahin et al. ............... | 711/162 |
| 6,813,731 B2 | * | 11/2004 | Zahavi et al. ............. | 714/45 |
| 6,963,959 B2 | * | 11/2005 | Hsu et al. .................. | 711/165 |
| 2004/0221115 A1 | * | 11/2004 | Sahin et al. ............... | 711/154 |

OTHER PUBLICATIONS

Sahin et al., "System and method for handling trace data for analysis", filed May 9, 2005, U.S. Appl. No. 11/124,875.*

* cited by examiner

*Primary Examiner*—Michael Nghiem
(74) *Attorney, Agent, or Firm*—K. Gupta

(57) ABSTRACT

The present invention provides a system, method, and program product for understanding, analyzing and troubleshooting performance issues in a data storage environment. More specifically, this invention is a system and method for preparing a trace of workload data for analysis by splitting information related to components on which the workload is experienced and by information type.

20 Claims, 22 Drawing Sheets

BOX_1

Reports

| General | Stat Analysis | Task Viewer | Trouble Shooter | Resp. Time |

[Run Rate Analysis] [Run Algnmnt Analysis] [View Rate (per sec)]
[Run Seq. Analysis] [Run All] [View Sequentiality]

Alignment and Track/Sector Crossing Analysis View Options

Component
◉ LV Level    ○ CPU Level    ○ Box Level    [View Alignment]

Metrics
◉ Track Crossings    ○ Partial Sector Operations

Info: DISK (BE: data) ▼    IO type: ALL IO ▼    Rate Type: ◉ IO ○ MB    transf. ratio

| DISK | #IOs | avIO/s | maxIO/s(bck=1.0s) | maxIO/s(bck=0.1) |
|---|---|---|---|---|
| 01C-C0 | 4920 | 26 | (65,10.0s) | (160,5.6s) |
| 01C-D5 | 3619 | 19 | (49,120.0s) | (150,89.5s) |
| 01D-DE | 3053 | 16 | (32,15.0s) | (150,14.4s) |
| 01A-C2 | 4582 | 24 | (47,1.0s) | (140,182.5s) |
| 01D-C5 | 2478 | 13 | (38,30.0s) | (140,86.5s) |
| 16C-D0 | 3076 | 16 | (31,62.0s) | (140,86.5s) |
| 16C-D2 | 3296 | 17 | (35,21.0s) | (140,60.2s) |
| 01A-CA | 4378 | 23 | (62,157.0s) | (130,141.1s) |

Ready | Run Analysis or View Results

FIG. 5A

Parameters

Split metavolume activity ☑
into metamembers

Per sec analysis
Bucket size [Default]
(Default is ~200 timestaps per trace duration.
Relevant only for initial trace processing)

Rate Analysis
Bucket size [1000] millisec

Alignment Analysis
Bucket size [1000] millisec
Detailed View ☐

Transfer Ratio
Calculation Chunk [60] sec
(for traces containing both FE and BE info)

Sequentiality Analysis
Max. Gap Between IOs in a Sequence [1] sec
Min. Sequence Length [3] IOs
Min. subinterval [30] sec

Trouble Shooting Report
Max. Details ☐

[ OK ]  [ Cancel ]  [ Default ]

- Command Descriptor Block trace - inlines format

6da490 14c 58.489*  COMMAND CDB........B01 A6 2A000097 77D00000 1000
6da493 14b 58.533*  COMMAND CDB........A01 1EF 0802BB60 1000
6da495 14a 58.547*  COMMAND CDB........A01 22D 280000B9 00900000 1000

FIG. 6A

- Command Descriptor Block trace - text format 0.256476 Write  14c  00A6  9326944  16
0.256518 Read   14b  01EF    85488  16
0.256715 Read   14a  022D  8482256  16

FIG. 6B

| Name | Size | Type | Modified △ |
|---|---|---|---|
| ☐ trace_00018749 0028_20041212_211458 | | ⎫ | |
| ☐ extract_trace_00018749 0028_20041212_211458 | | ⎬ Detail Subdirectories | |
| 🗎 impl_00018749 0028_20041212_211719.bin | 41 KB | ⎭ | |
| 🗎 trace_00018749 0028_20041212_211458_0000.raw.gz | 14,269 KB | ⎫ Input files | |
| 🗎 trace_00018749 0028_20041212_211458_0001.raw.gz | 14,230 KB | ⎭ | |
| 🗎 trace_00018749 0028_20041212_211458.raw | 65,536 KB | ← SymmTran unzips and merges | |
| 🗎 extract_trace_00018749 0028_20041212_211458.txt | 204,923 KB | ← Extract file in text format (size!!) | |
| 🗎 SymmTrAnlog.txt | 1 KB | ← Log file if run in the batch mode | |
| 🗎 trace_00018749 0028_20041212_211458.smt | 93 KB | ← Summary project file | |

SYSTEM AND METHOD FOR PREPARING TRACE DATA FOR ANALYSIS

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the patent and Trademark Office patent file or records, but otherwise reserves all copyright rights whatsoever.

RELATED APPLICATIONS

This application is related to co-pending U.S. patent application Ser. No. 11/124,875 entitled "System and Method for Handling Trace Data for Analysis" by Sahin, et. al, filed on May 9, 2005, with this application, and is assigned to EMC Corporation, the same assignee as this invention.

FIELD OF THE INVENTION

This invention relates generally to systems and methods for preparation of workload data from a data storage environment for analysis, and more particularly to a system and method that may access trace data of workload activity produced in a data storage system, prepare it, and then analyze the trace data in the same or a different environment for benchmark testing or other reasons.

BACKGROUND OF THE INVENTION

It is well known to capture workload data from a data storage system for different reasons including analysis for troubleshooting or performance-related issues. A problem encountered in trace processing and analysis is caused by the huge amount of information contained in a captured trace. The longer the trace duration and more complex the box configuration the bigger the trace size. The typical trace size for several minutes of data collection may reach hundreds of megabytes. Because of the size constraint, the analysis program cannot hold all relevant data in computer memory. It would be an advancement in the art to solve these and other trace-related analysis programs associated with captured trace data.

SUMMARY OF THE INVENTION

To overcome the problems of the prior art mentioned above and to provide advantages also described above, this invention in one embodiment is a method for preparing captured traces of workload data in a data storage environment for analysis. The traces are prepared by categorizing information from the capture trace into categories. The categories are related to (i) components in the data storage system experiencing the traced workload activity and (ii) information type including response times and task events. The categories are used for access to trace-related information for trace analysis by the computerized trace analysis process.

In another embodiment the invention is an apparatus enabled for performing method steps of the method embodiment. In another embodiment the invention is a system enabled for performing method steps of the method embodiment. In still another embodiment the invention is a computer program product including a computer-readable medium having program logic encoded thereon that enables performance of method steps of the method embodiment.

BRIEF DESCRIPTION OF THE DRAWINGS

The above and further advantages of the present invention may be better under stood by referring to the following description taken into conjunction with the accompanying drawings in which:

FIG. 5A shows information collected and categorized in preparation for analysis by the Trace Analysis Process;

FIG. 5B shows a dialog enabled by the Program Logic of FIG. 1 and useful for the Trace Analysis Process;

FIG. 6A shows an example of a Command Descriptor Block (CDB)-related event captured in a Trace File;

FIG. 6B shows an example of a readable-text format appearing in a more understandable format that shown in FIG. 6A enabled by a conversion caused the Program Logic of FIG. 1;

FIG. 8 shows information for a user on a presentation screen enabled by the Program Logic;

DETAILED DESCRIPTION OF THE PREFERRED EMBODIMENT

Figure 1:
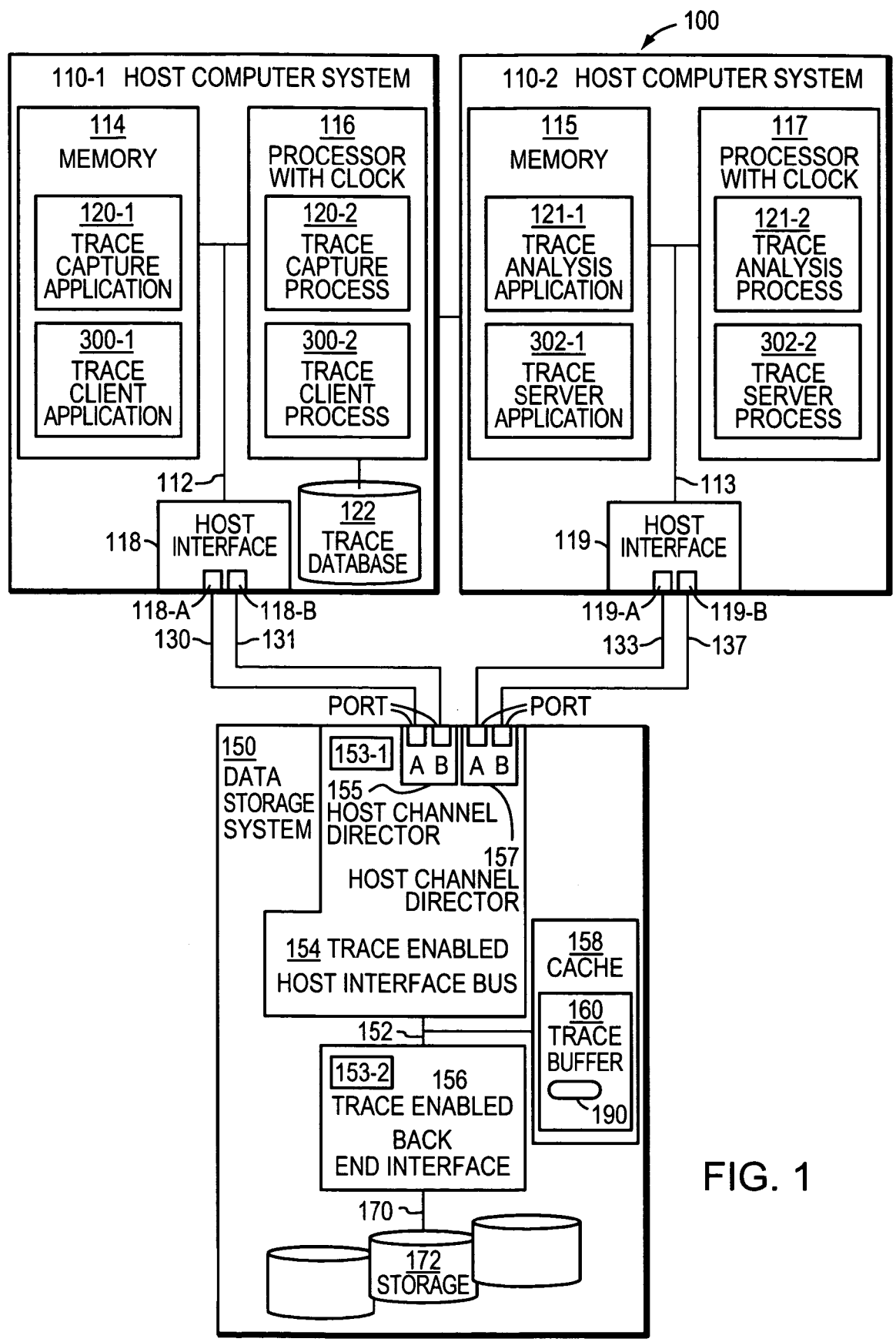
FIG. 1 shows a block diagram schematic of an embodiment of the system of this invention including a data storage system and application and process program logic operating in computer memory for carrying out embodiments of the method of this invention.

Embodiments of the present invention provide a unique system, method, and program product for understanding, analyzing and troubleshooting performance issues in a data storage environment.

Overview

The invention is directed toward preparing and handling trace information to be used for understanding, analyzing and troubleshooting performance issues in a data storage system. So the first step of the overall embodiment of the method is to access a workload. Such accessed data is typically in the form of trace data accessed form I/Os operating on data volumes or logical devices on one or more data storage systems. Logical devices are sometimes interchangeably referred to as data volumes and generally refer to logical representations of physical volumes of data on a physical storage device. A workload trace data accessing system useful with the present invention is described in U.S. Pat. No. 6,813,731 entitled "METHODS AND APPARATUS FOR ACCESSING TRACE DATA" to Zahavi et al. issued Nov. 2, 2004 and assigned to EMC Corporation the assignee of the present application and which is hereby incorporated by reference. A system and method for trace data capture are also described in U.S. Pat. No. 6,769,054 "System and method for Preparation of Workload Data for Replaying in a Data Storage Environment" to Sahin, et al. issued Jul. 27, 2004 and also assigned to EMC Corporation the assignee of the present application and which is hereby incorporated by reference.

In general, and preferably, for the accessing of data it is extracted to a binary file for processing. The size of the trace file depends on the events being traced, the number of IOs traced and the trace duration. Once data is accessed in the form of a trace file it can be made ready for being analyzed, and analyzed as described in more detail below. The trace file contains information about I/O activity also referred to as workload data on the data storage system from which the trace was accessed. Such a data storage system may be the preferred EMC Symmetrix Data Storage System or CLARiiON Data Storage System available from EMC Corporation of Hopkinton, Mass.

In a preferred embodiment the exemplary data storage system for which workload data is to be captured and analyzed in accordance with methodology described herein is a Symmetrix Integrated Cache Disk Arrays available from EMC Corporation of Hopkinton, Mass. However, it will be apparent to those with skill in the art that there this invention is useful with any data storage system. Nevertheless, regarding the preferred embodiment, such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

Overview of Trace Creation or Access Step

The data storage system is equipped with an event trace routine configured according to embodiments of the invention which is able to access trace data and/or trace buffer pointer information for a trace buffer when called upon to do so by the Trace Capture Process. Using the event trace routine, the Trace Capture Process can determine when new trace data is available in the trace buffer in the data storage system, for example, by detecting advancement of a trace buffer pointer. The Trace Capture Process can then use the event trace routine to access (i.e., to read) the trace data in the trace buffer and to obtain an update on the current value of the trace buffer pointer. By keeping track of previous and current trace buffer pointer locations and how frequently the trace buffer pointer changes, the Trace Capture Process can determine exactly how much, and how frequently, trace data is written to or added to the trace buffer during operation (e.g., execution) of a software program in trace mode in the data storage system.

Embodiments of the Trace Capture Process can adjust the frequency or timing between calls to the event trace routine to obtain trace data from the trace buffer at a rate sufficient enough to avoid trace data being overwritten in the trace buffer. The timing between calls to the event trace routine can be adjusted dynamically according to an adaptive timing algorithm which can take into account such factors as the number of events being traced, the amount of trace data created during the occurrence of trace events, and the speed and length of time during which the software program operating in trace mode is allowed to perform. Embodiments of the invention can thus remotely capture trace data over prolonged periods of performance of software programs that operate in trace mode in a data storage system without software developers having to interrupt the software programs in order to manually capture the trace data.

Overview of Preparation and Handling for Analysis Process

Based on a critical recognition by the inventor that a problem encountered in trace processing and analysis is caused by the huge amount of information contained in the trace, the inventors include modules for functionality to achieve the following methodology (reference is made to a Trace Analysis Process and Trace File which are explained further below):

1. Handling/categorizing of trace data in multiple files organized by components and by the information they contain (IO rate, event tasks or response time). This provides quick access to component data when necessary.
2. Creating a relatively small file that contains the summary information about the trace. Since the trace files are large, it is very difficult to share them with others. With the summary files, field personnel can share interesting cases with their peers and performance experts in corporate headquarters.
3. A server program that listens for client analysis programs. When a Trace Analysis Process session starts, it connects to the server and reports who is using the program and for how long. Also, the client Trace Analysis Process can transfer summary trace file into the server. This enables
   a. Further analysis by using the summary data
   b. A database of summary file examples showing customer performance problems, symptoms and potential solutions.

4. A multipass operation for a Microsoft Windows operating system, which has a limit on the number of open files. When trace data is rearranged into multiple component files, the program needs to open many more files than this limit. The Trace Analysis Process overcomes this limitation by passing through the Trace File multiple times.

System Architecture of an Embodiment Useful for Capturing and Replaying Trace Data FIG. 1 illustrates an example of a computing system environment 100 configured in accordance with embodiments of the invention. The computing system environment 100 includes a host computer system 110-1 and 110-2 coupled via data interface lines 130, 131, 133 and 137, respectively as shown, to data storage system 150.

The host computer system 110-1 includes an interconnection mechanism 112 coupling a memory 114, a processor with clock 116, a host interface 118. The memory 114 is encoded with program logic instructions such as software application code and/or data which collectively form A Trace Capture Application 120-1 configured in accordance with embodiments of the invention. The I/O activity from the hosts is directed over respective host interfaces 118 and 119 and their respective host bus adapters (HBA's), network interface cards (NIC's) or any other contemporary interconnectivity adapters 118A–B, and 119A–B to respective host channel directors 155 and 157 and their respective ports 155A–B and 157A–B.

The processor 116 can access the logic instructions that form the trace capture application 120-1 via the interconnection mechanism 112 to the memory 114 in order to perform (e.g., execute, run, interpret or otherwise operate) such logic instructions. When this happens, a Trace Capture Process 120-2 is formed via the combination of the logic instructions of the trace capture application 120-1 operating on the processor 116. In other words, the trace capture application 120-1 represents an embodiment of the invention in a computer readable medium such as the memory 114, which includes logic instructions that when performed on the processor 116, provide an embodiment of the invention referred to herein as the Trace Capture Process 120-2. During operation, the Trace Capture Process 120-2 can access a trace database 122 in order to store trace data, as will be explained.

The host computer system 110-2 includes an interconnection mechanism 112 coupling a memory 115, a processor with clock 117, and a host interface 119. The memory is encoded with logic instructions such as software application code and/or data that collectively form a Trace Analysis Application 121-1. The processor can access the logic instructions that form the workload via the interconnection mechanism 121 to the memory in order to perform (e.g., execute, run, interpret or otherwise operate) such logic instructions. When this happens, a Trace Analysis Process 121-2 is formed via the combination of the logic instructions of the application operating on the processor.

In other words, the Trace Analysis Application represents an embodiment of the invention in a computer readable medium such as the memory, which includes logic instructions that when performed on the processor, provide an embodiment of the invention referred to herein as the Trace Analysis Process.

Figure 22:
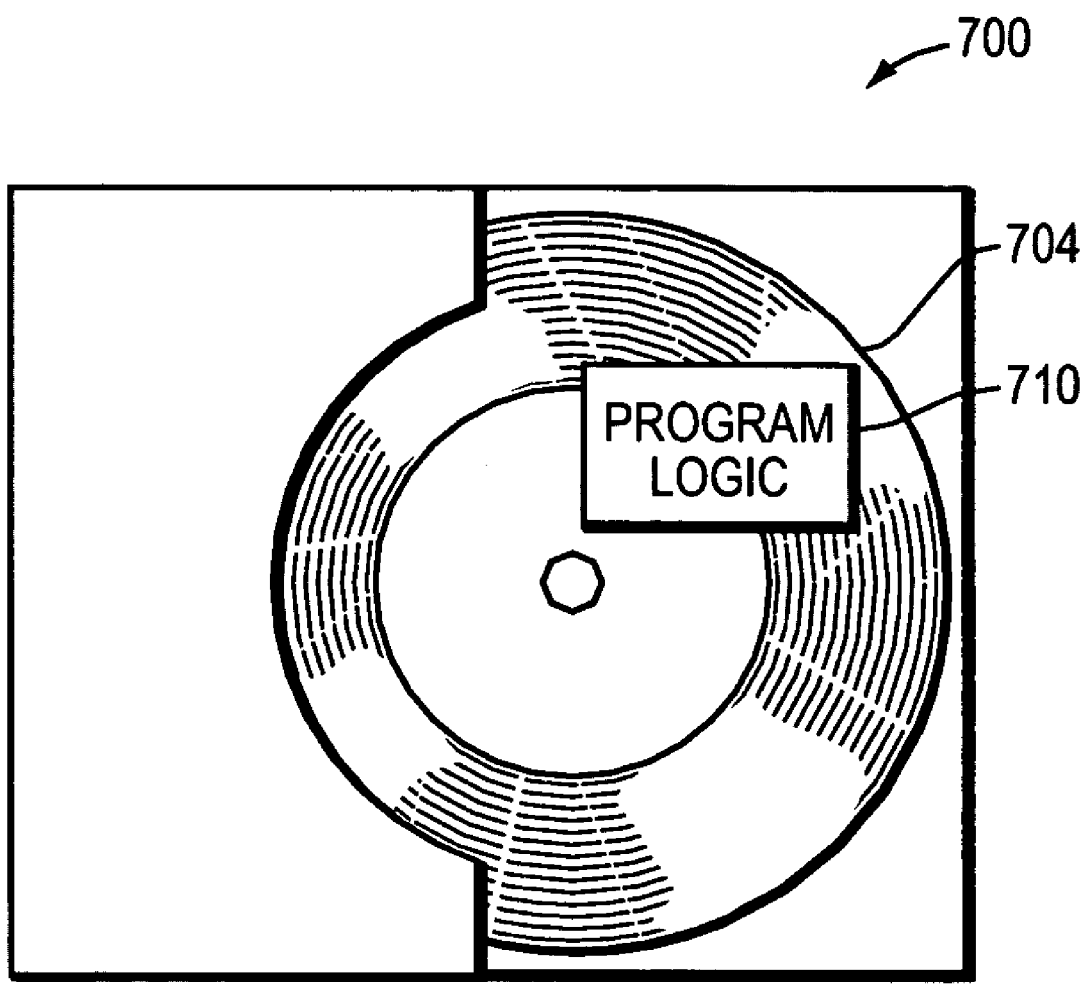
FIG. 22 shows a computer-readable medium encoded with Program Logic similar at least in part to the Program Logic of FIG. 1 for carrying out methodology of this invention.

The methods and apparatus of this invention may take the form, at least partially, of program code (i.e., instructions) embodied in tangible media, such as floppy diskettes, CD-ROMs, hard drives, random access or read only-memory, or any other machine-readable storage medium forming a computer program product. FIG. 22 shows such a computer program product 700 including a computer readable medium 704 including (Trace Analysis) Program Logic 710 that when executed by a CPU becomes all or part of the Trace Analysis Process 121-2 for carrying out the methodology described herein. When the Program Logic or program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operate analogously to specific logic circuits.

Returning to the aspect of capturing the trace data, reference is once again made to FIG. 1. The data storage system 150 includes an interconnection mechanism 152 which couples a trace enabled front end interface 154, a trace enabled back end interface 156 and a cache 158 (e.g., a cache memory system). In this example embodiment, the cache 158 is encoded with a trace buffer 160 (e.g., a data structure) which is able to store trace data 190. The trace enabled back end interface 156 includes a coupling 170 to one or more storage devices 172 which may be disk drives, tape drives, or any other storage media. According to the general operation of the data storage system 150, the trace enabled front end interface 154 couples to the data interface 130 to process data access requests (not specifically shown) on behalf of host computer systems (e.g., 110 and others, not specifically shown) for access to data stored within the data storage system 150. The trace enabled back end interface 156 handles data access operations related to data stored within the storage devices 172. An example implementation of the data storage system 150 is a Symmetrix data storage system manufactured by EMC Corporation of Hopkinton, Mass., USA.

The trace enabled front end interface 154 and the trace enabled back end interface 156 are called "trace enabled" interfaces since each represents at least one processor which can perform a respective software program 153-1, 153-2 that can each operate in trace mode to produce the trace data 190 within the trace buffer 160. For purposes of the descriptions of embodiments of this invention, it is not particularly important which processor (one or more) operating a software program 153 (e.g., 153-1 or 153-2) within the data storage system 150 produces the trace data 190 in a trace buffer 160. To this end, the software programs 153-1 and 153-2 may be different and may operate separately or together to produce trace data 190 separately or concurrently. In this example then, such trace data 190 may be produced and placed into the trace buffer 160 from either the front end or back end interfaces 154 or 156. It is to be understood that these processors 154, 156 operating the software programs 153-1, 153-2 are illustrative only and that any processor within any component (e.g., a processor operating perhaps within a storage device 172) in the data storage system 150 may produce the trace data 190 in the trace buffer 160.

The incorporated '731 and '054 patents show techniques for capturing traces, so not much more detail is given here regarding trace capturing for the sake of simplicity. Also, while the example explanations of preferred embodiments presented herein explain certain techniques for accessing trace data and reconfiguring it prior to trace analyzing, it is to be understood by those skilled in the art that variations on these mechanisms and techniques are possible and are intended to be within the scope of embodiments of the invention. For example, the host computer systems may be any type of general purpose or dedicated (e.g., specific purpose) computer system and it is to be understood that the host computer system shown in the figures is shown by way of example only. Likewise, the data storage system can be any type of data storage system, large or small, and may contain any number of processors that operate to produce trace data 190 in a manner such as that explained above, and analysis it as described below.

Referring to FIG. 1 an operational feature of the Trace Capture Process is shown. The feature provides exchanging data storage system configuration and project files. A Trace Analysis Server Program 300-1 runs on host computer 110-2 and when executing becomes Trace Analysis Server Process 300-2. Another program which is Client Program 302-1 when executing as Client Process 302-2 is embedded into every Trace Capture Process. The computers 110-1 and 110-2 are connected with Ethernet running TCP/IP. The connection type and communication protocol can be any contemporary protocols available.

The Client Process finds the Server and sends it different statistics about users, session duration and such information. Also, the Client can transfer (upload) project summary trace files directly to the server (project files are discussed in detail below. This enables further analysis by the engineering using the summary data and a creation of a database (not shown) of summary file examples showing customer performance problems, symptoms and potential solutions. This server communication is conceptualized as the Server Communication Module.

Figure 2:
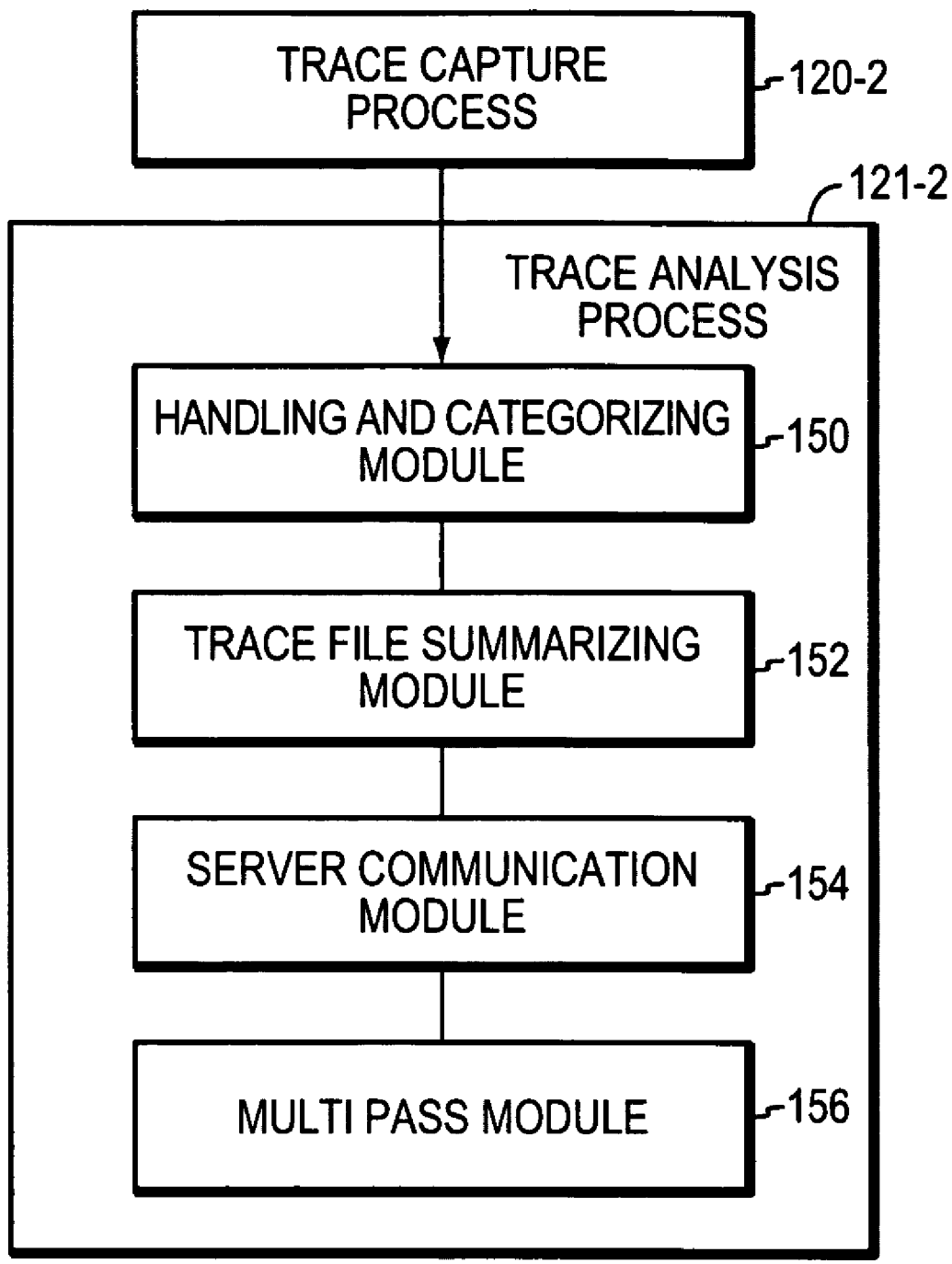
FIG. 2 shows a schematic block diagram overview of a functional relationship of the Trace Capture Process and the Trace Analysis Process that operates as a method embodiment of the invention and with the embodiment of the system shown in FIG. 1.

FIG. 2 shows a schematic of the cooperative interaction of the Trace Capture Process 120-2 and Trace Analysis Process including the following modules: Handling and Categorizing Module 150; Trace File Summarizing Module 152; Server Communication Module 154; and Multipass Module 156. Characteristics of these modules are described below; however the module functions are explained herein as a conceptual model for explaining the major types of functions performed with the Trace Analysis Process rather than necessarily indicating that there are specific program code parsed into such modules (although that could be the case).

Figure 3:
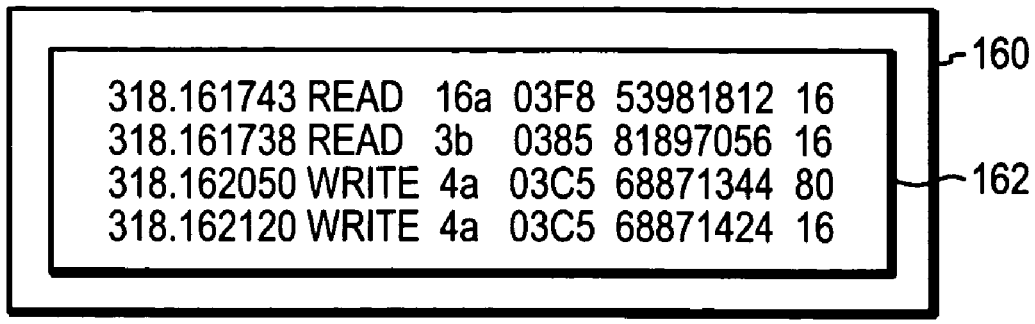
FIG. 3 shows an example of at least a portion of contents of a Trace File captured by the Trace Capture Process of FIG. 2.

FIG. 3 shows an example of information in Trace File 160 including I/O timestamp information 162 including several information fields. A time stamp field records when the IO is issued by the host system or received by the storage system, it is a floating point number, the unit is seconds. For example, in FIG. 3, a time stamp field reads 318.161743 seconds. The operation IO type shows the direction of the IO relative to the storage system, i.e., whether a Read or Write command is issued to disk, preferably a text string. A port identifier field yields a record of either the Source port id (e.g. 16a) that indicates which HBA (host-based adapter: the fibre channel or SCSI card on the host) initiated the IO, on a preferred EMC Symmetrix system. Other IO information is also presented, but for the sake of simplicity it will not be described further.

Initial processing of the trace is made on the component level, i.e. for each active component in the preferred Cache Disk Array Data Storage System the corresponding file is created containing the trace information pertinent for this component only. For easier identification it is a good choice to choose a file name that is meaningful containing component name, for example lv_008D.txt—for logical volume 008D, disk_data08B-D8.txt and disk_prot08B-D8.txt—for disk 08B-D8, cpu__14B.txt—for cpu 14B. This is one of the functions of the Categorizing Module, and other functions are described below.

Due to the fact that a large data storage system such as a preferred Symmetrix may contain thousands of components of one type, to overcome operational system number of simultaneously open files limit multiple scanning of trace is done. Important to note that this time consuming procedure should best be done only once during the first trace processing and created component files may be used in later sessions. Also, these component files may be used for extracting detailed trace information at any timestamp.

The typical statistics is collected in the table presented on user screen 200 in the FIG. 5A. As discussed above, the original trace information contains real timestamps of all IO's, which are not convenient for understandable presentation in a table or graphical form of IO rates. Therefore, during the first trace processing the default compartmenting of trace statistics is done. The default bucket size is 1 sec. In parallel, during the first trace processing, the main trace statistics is estimated for sub-bucket 0.1 sec. The difference in IO rates between bucket and sub-bucket gives information about bursts in the trace.

Figure 4:
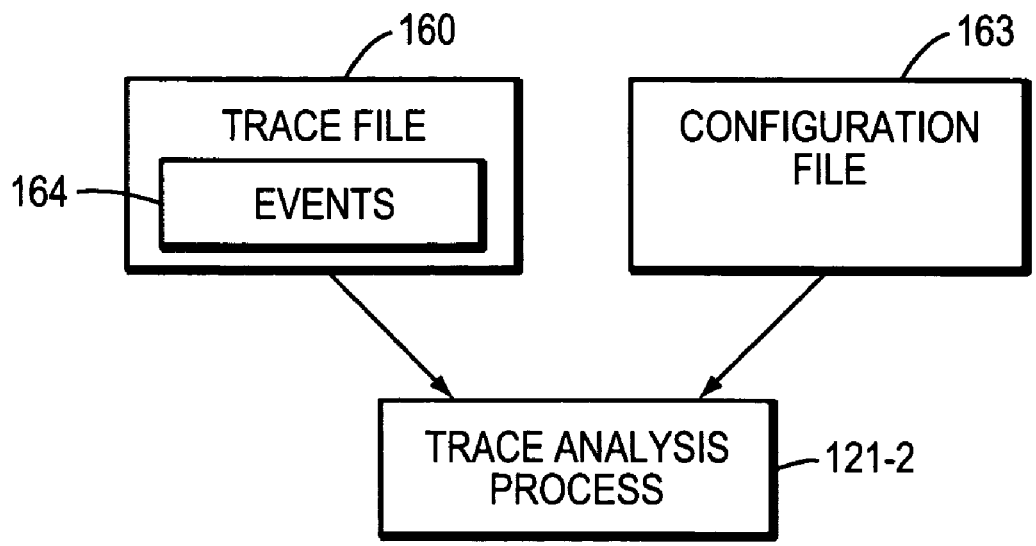
FIG. 4 shows a schematic block diagram overview of a functional relationship of a Trace File including Events and a Configuration File which are each useful inputs for the Trace Analysis Process.

Referring to FIG. 4, schematics are shown for illustrating that the Trace File 160 and Configuration File 163 are key inputs for the Trace Analysis Process 121-2. In the preferred Symmetrix system, the configuration is gathered from an internal configuration file. The configuration file provides mapping of the devices in the front end (host-adapter) and in the back end (disk-adapter). Furthermore, it includes how logical volumes are mapped to physical drives, as well as mirror and parity locations. The Trace Analysis Process uses the information in the configuration file to separately analyze each of the components in the system. The components are the front end and back end CPUs, logical volumes (a.k.a. LUNs—logical unit numbers), and physical drives.

Event traces includes multiple (tens) of events for every IO in the system. Each trace event contains specific information about particular action taken by the system at a particular time instant. The time resolution of events in the system is in the order of microseconds. For example there are events, such as Command Descriptor Block (CDB) events in the open systems emulations and Command and Command Parameters events in the mainframe emulations that indicate start of an IO with details about the IO: logical volume, director/controller, IO type (read, write, etc), IO size, and IO address. There is also another event that indicates the end of the IO. Using the events showing the start and end of IO it is possible to calculate the response time of an IO inside Symmetrix. In addition, there are events that give information about specific phases of IO's. For example, the task events provide information about the duration of emulation tasks.

Traces show the workload profile one IO at a time. The Trace Analysis process then singles out individual IO's if for example it takes too long to complete it. The Trace Analysis Process also allows compartmentalizing the information in traces to get averaged values at any time resolution, including coarse time resolutions that conventional analysis programs provide.

The users can load multiple segmented and compressed trace files directly into the Trace Analysis Process which then un-compresses and merges them. The trace events that are recognized and analyzed include:

CDB (OS emulation) and Command and Command Parameters (Mainframe computer emulation) events DV TASK event: is event that shows the duration of emulation tasks.

Several other events to determine end of an IO in order to calculate the response time.

The traces collected from front end and back end directors are processed and analyzed.

FIG. 5B shows a dialog presented on user screen 202, wherein the user may control the bucket size to make more or less dense trace processing. The information about component trace information is stored in a specially designated format for this file (for example, lv_buck_00DA.txt.— contains information for logical volume 00DA). It gives opportunity to plot IO rates in a very fast manner for any component (for selected compartment or bucket size) and for the whole data storage systems or box level as discussed presented in FIG. 16 discussed below.

FIGS. 6A–6B show event types that are included in Trace Events. FIG. 6A shows in information box 206 CDB trace in the inline format received in the Trace Capture Process. On the other hand, FIG. 6B shows in information box 208 the CDB trace event in a text format converted by the Trace Analysis Process and which can be presented to a user on a user screen for better understanding.

Figure 7:
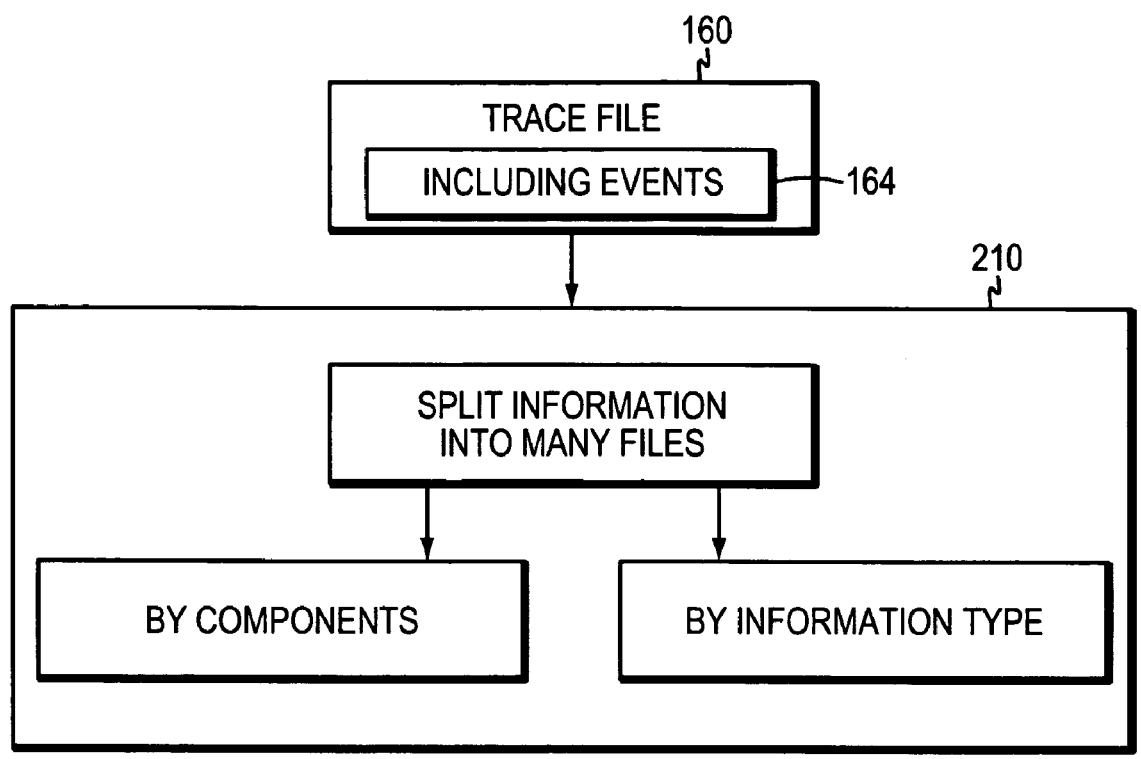
FIG. 7 shows a schematic functional block diagram depicting that a Trace File including Events is split into many files by components and by information type by the Program Logic of this invention for use in the system of FIG. 1.

FIG. 7 shows that the Trace File 160 including Events 164 are handled by the Trace Analysis Process as shown in Functional box 210 that includes the operations of Splitting Information into many files by Components or by Information Type. Trace files may be quite large. The size of the trace file depends on the duration of trace collected and the number of events collected. The more events collected, and the longer the trace, the larger the file is. It is possible to collect several gigabytes of traces. But typically 30–300 MB traces are collected from data storage systems operating in the field.

The Trace Analysis Program should have access to information in the traces. There are two approaches:

1) Store the trace file and all possible information combinations in the trace in the computer's RAM. The computer referred to here is the computer analyzing the trace, i.e. running the Trace Analysis Process. This provides quick access to information; however, due to size requirements it is nearly impossible to fit everything into the RAM available in contemporary computers. Once the RAM is full, the computers starts swapping in and out of local disk drive. This slows down the processing since page swaps are not controlled by the analysis program.

2) The alternative is to keep all relevant information in files in the local disk drive arranged specifically by the analysis program so that access to them will be relatively quick. It is preferred to implement this second approach, but one skilled in the art will recognize that the first approach may be used.

When a user loads a new Trace File, the Trace Analysis Process splits the information in the trace by the components (front end LV, back end LV, front end director, back end director, disk, etc), and by the information type (IO rate, alignment, sequentiality, task events, response time). The split information is placed in many files in the same location as the trace file. Thus, the program requires file access very frequently. As accessing network shares is costlier (time, bandwidth etc) than accessing local hard drive(s), it may be preferable to avoid loading files from network shares.

FIG. 8 shows information presented on user screen 212 including the directory structure, input files, task events and other information. Importantly, one may note that the original trace file size (uncompressed) is 64 MB, but the summary (.smt) file is only 93 KB, a significant decrease in size yet critical information for the Trace Analysis Process is available in the .smt file. An important feature of the Trace Analysis Process is a creation of a project summary (.smt) file. Despite a usually very large size of the Trace File, the project .smt file is only a fraction of its size. Yet, the .smt file contains about 90% of trace statistical information such as rates, misalignment parameters, sequences.

In .smt-only session rates, misalignment and sequentiality plots as well as troubleshooting results may be restored without any access neither to original trace file not to split component files. In such a way, field personnel can share interesting cases with their peers and performance experts in corporate headquarters (sending project files by, for example, email).

The structure of these Trace Files are described in the project file (.smt file). This way, when a user wants to continue analysis at a later time, s/he can just load the smt file and avoid time consuming re-splitting process. Two functions of the project file include (1) providing quick and easy access to split file structure; and (2) sharing among analysts. Depending on the trace file size and strength of computer CPU/hard disk, it could take a few minutes to half an hour to load and split the trace file. But once the trace is loaded and split, it is just a fraction of a second to load the project or .smt file and continue with the analysis. As mentioned above, there is a significant size difference between trace file (64 MB) and the .smt file (93 KB). This example shows how important it could be to summarize the trace file and share the summary file rather than extremely detailed trace file. Such a summary file may include a summary of task events and response time information. This is a function of the Summarizing Module.

Since loading and splitting the trace file takes a long time and consumes computer resources heavily, the Trace Analysis Process can include a command line mode in which users can load and process the trace files in batch mode. Also it is possible to start the Process at low priority mode so that it will not compete with computer resources when a user is interacting with the computer.

Figure 9:
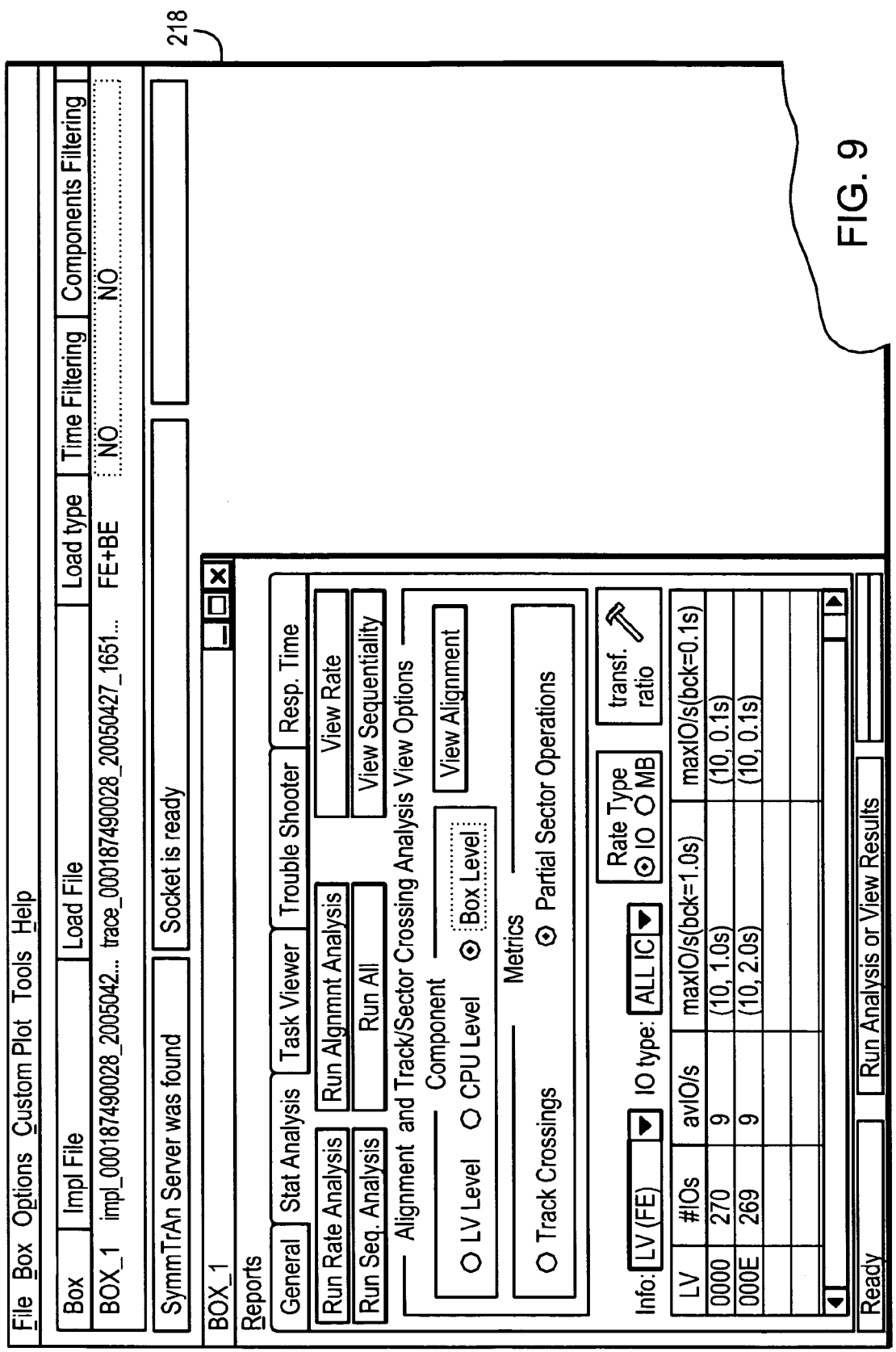
FIG. 9 shows modes for performing an analysis with the Trace Analysis Process presented on a user screen.

FIG. 9 shows four different analysis modes presented for activating for use on user screen 218. The analysis modes include Stat Analysis; Task Viewer; Troubleshooter; and Response Time modes. The screen capture shows these 4 modes in 4 tabs.

This Stat Analysis tab includes sub-analysis functions now described. Rate Analysis provides throughput (IO's/s and MB/s) and IO size information at different components. The default bucket size is 1 seconds, but users have the option of selecting smaller or larger time buckets to view the rates. Also, double-clicking the charts shows finer granularity buckets as well as individual IO's. Sequentiality Analysis shows the sequentiality pattern of the workload as well as the percent of IO's present in sequences. The sequences of IO's (i.e. IO's with consecutive addresses) are special in that storage systems exploit their sequential pattern by prefetching (reading-ahead) thereby increasing the chances of cache hits. For workloads with high read sequential components, one expects the performance level comparable to cache hits.

Alignment also has some performance implications. Those IO's spanning multiple cache pages (cache slots or tracks) may cause contention for cache page locks. Similarly, there is a CRC calculation penalty for write IO's resulting in partial sector operations. By looking at the alignment of the IO's in the system, the Trace Capture Process may identify performance issues caused by the misalignment of IO's.

Figure 10:
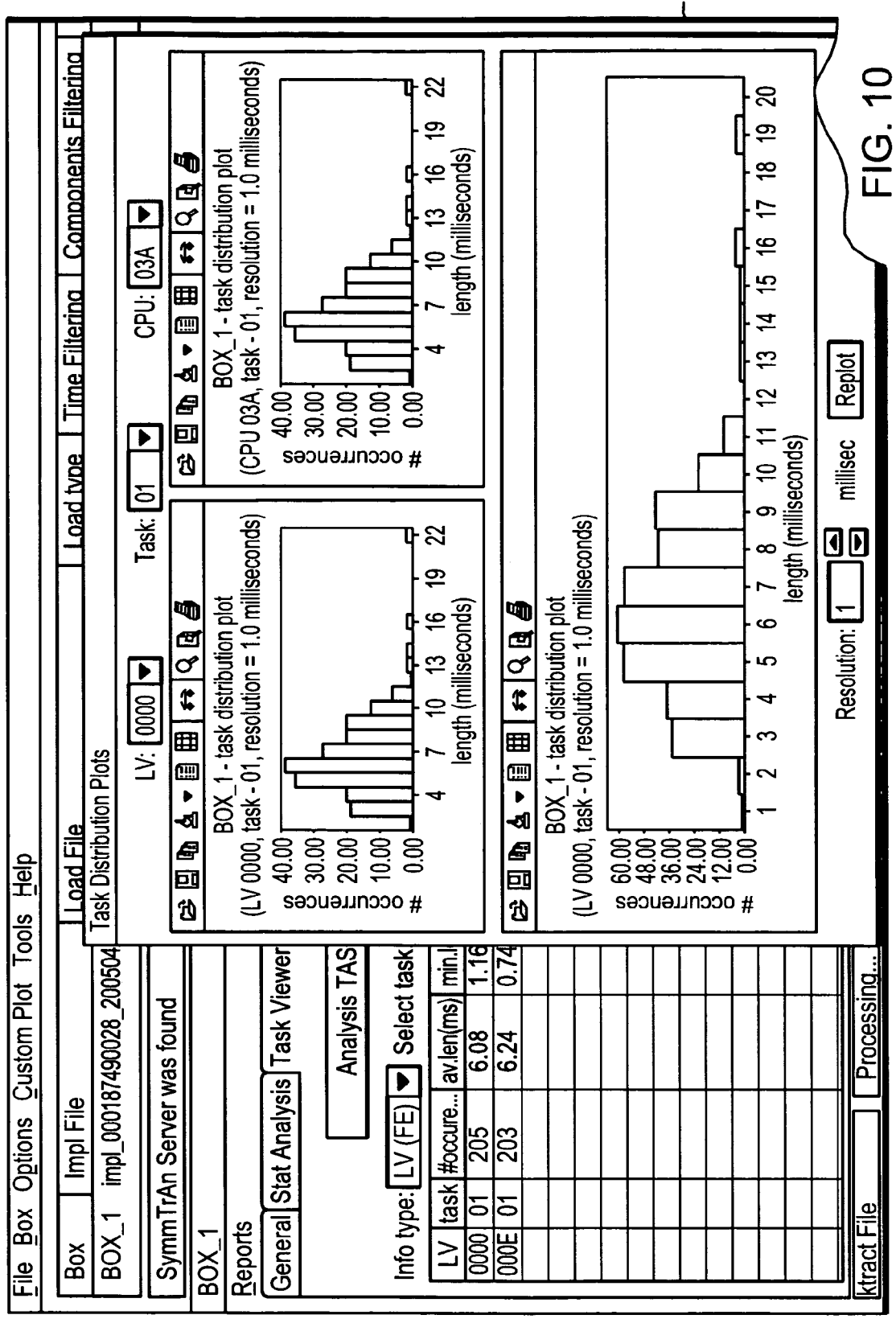
FIG. 10 shows an embodiment of an event Viewer that analyzes task events, and presents task durations on a user screen.

FIG. 10 shows on screen 220 the Event Viewer that analyzes task events, and presents task durations in the trace. Duration of these tasks indicate potential performance problems. For example if the task associated with access to a disk through a disk adapter is too high, it may indicate that there is a problem with the physical disk.

Figure 11:
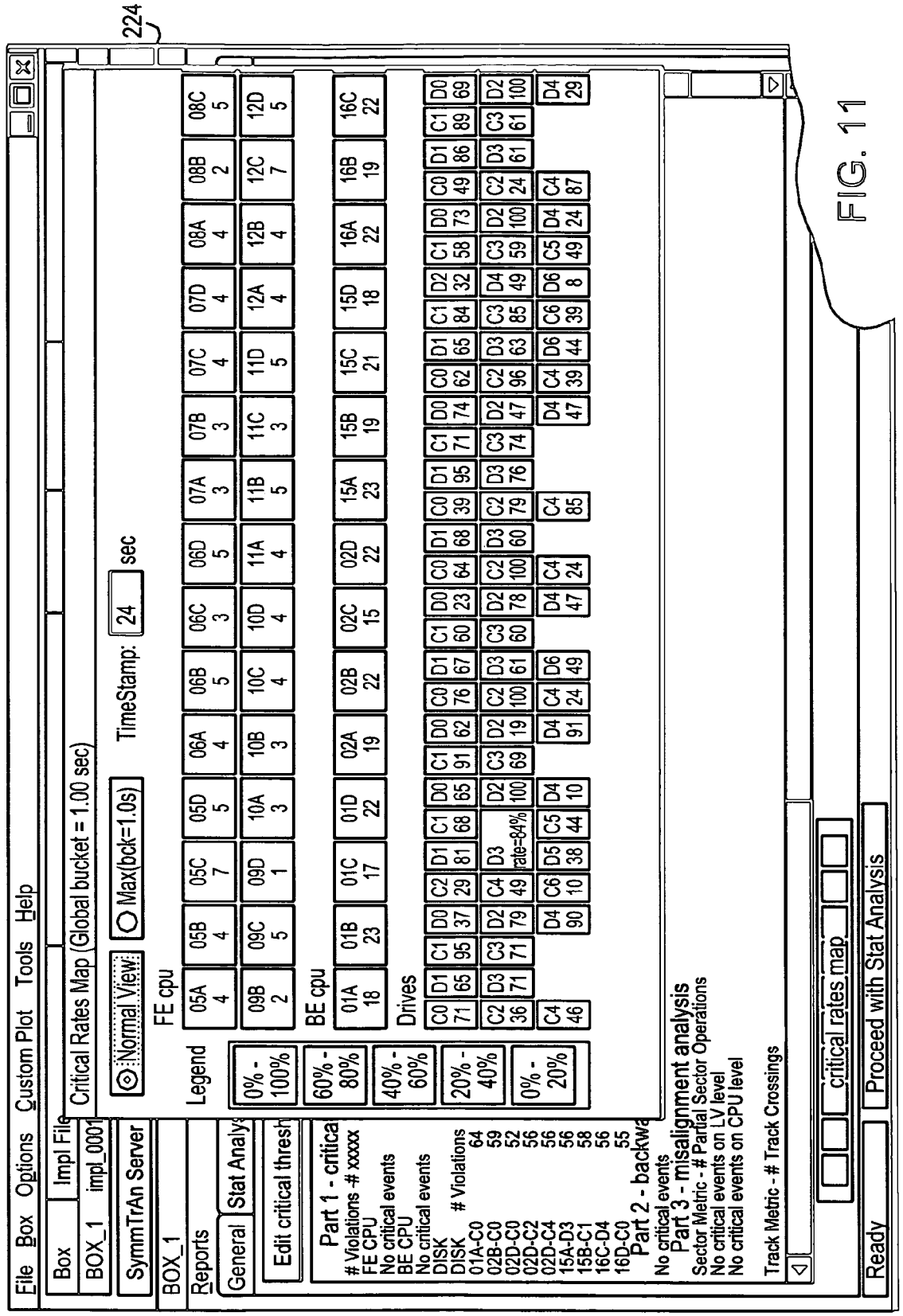
FIG. 11 shows a Trace Analysis Process troubleshooting rules report presented on a user screen specified for components.

FIG. 11 shows a troubleshooter tab presentation on user screen 224 that contains the critical performance thresholds for certain performance metrics. The "rules" are user editable. In this tab, the user can pass the information through the rules and Trace Analysis Process flags and reports violations. Also, Trace Analysis Process provides a color-coded "critical values" map that shows violations of throughput figures at components (shown in black and white distinctive patterns in FIG. 11).

Figure 12:
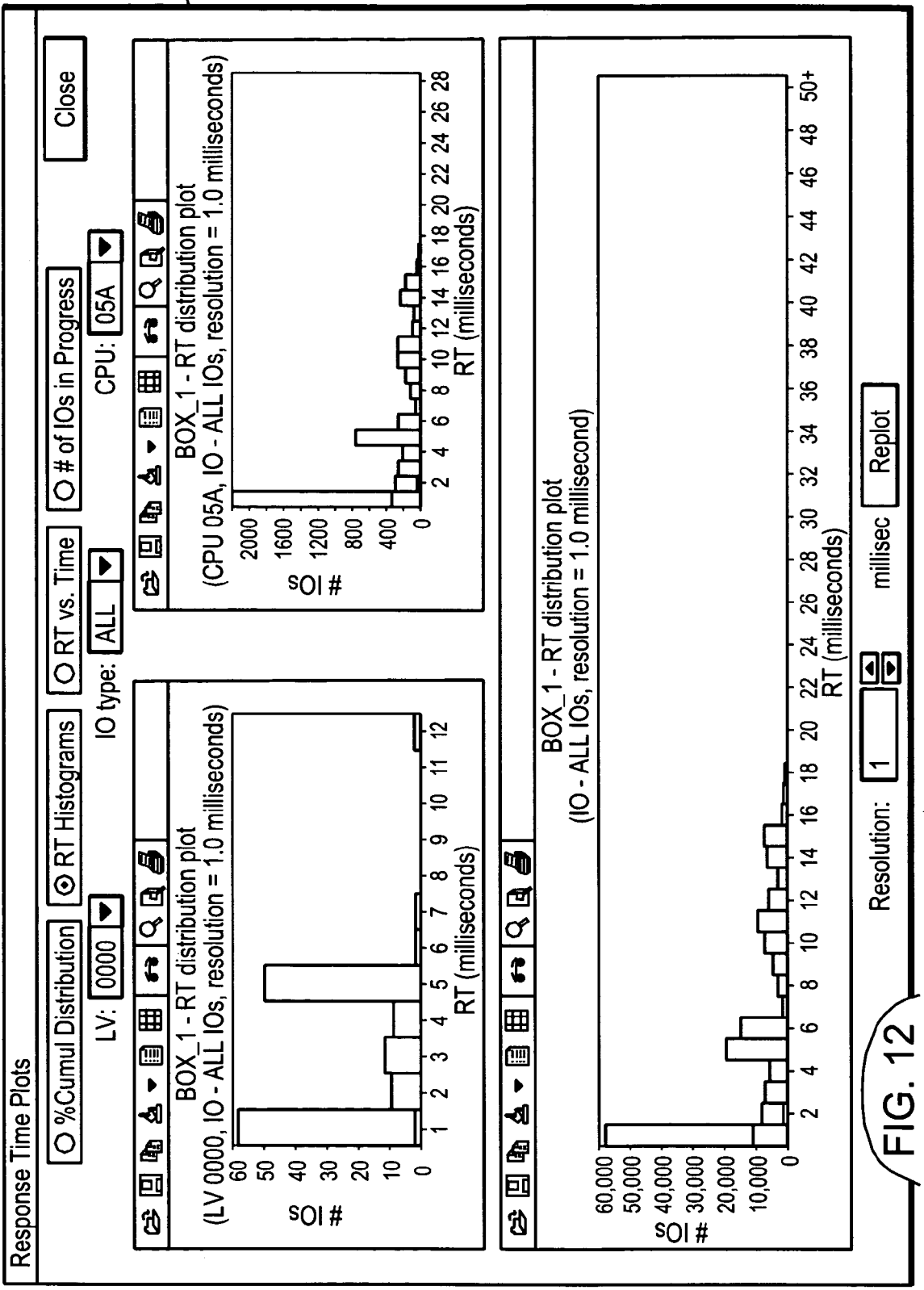
FIG. 12 shows a response time histogram presented on a user screen and viewable at a component or data storage system level.

FIG. 12 shows a response time histogram presented on a user screen 226 that is viewable at a component or data storage system level. This chart shows the response time histogram at the LV, director and the system level. It shows the number of IO's at each response time bucket shown in the x-axis (horizontal axis). This histogram may also be called as relative frequency chart. When normalized by the number of IO's, these charts are called probability density functions (PDF). The area under PDF is always 1 (or 100%). The users may change this chart to show: all IO types (read, write etc); only Reads; and/or only Writes. Also, users may select different LVs and directors from the pull down boxes.

Figure 13:
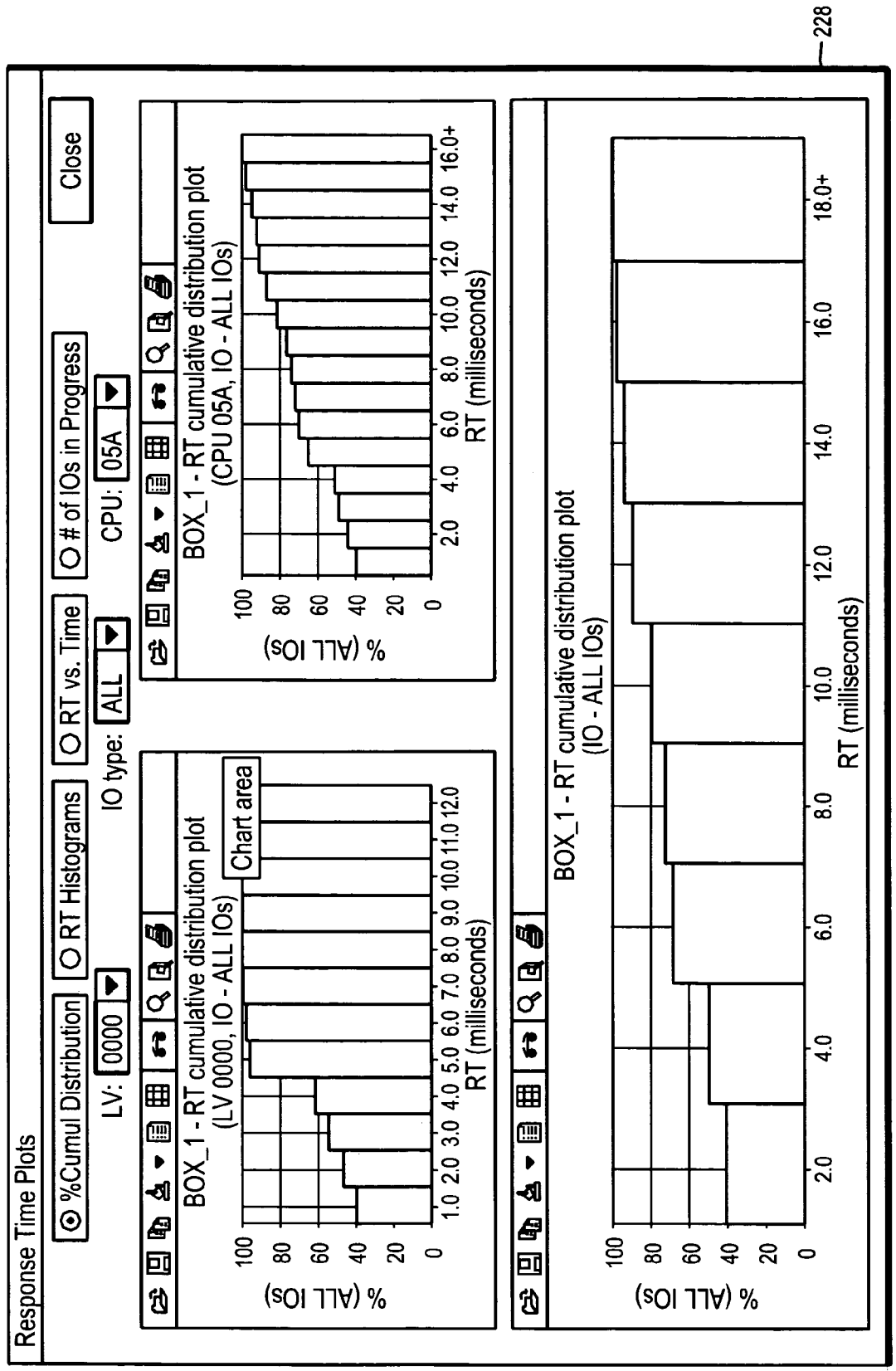
FIG. 13 shows a chart presented on a user screen for analysis at component or data storage system level.

FIG. 13 shows a chart presented on a user screen 228 for analysis at component or data storage system level. This chart shows the percent cumulative distributions at the LV, director and the system level. For any given response time value in the x-axis, it shows the percent of IO's with response times with that value or less. In mathematical terms, this chart is the cumulative distribution function (CDF). CDF is the integral (cumulative sum) of PDF. Hence, the CDF charts always end up at 100%. The users may change this chart to show: all IO types (read, write etc); only Reads; and/or only Writes. Also, users may select different LVs and directors from the pull down boxes.

Figure 14:
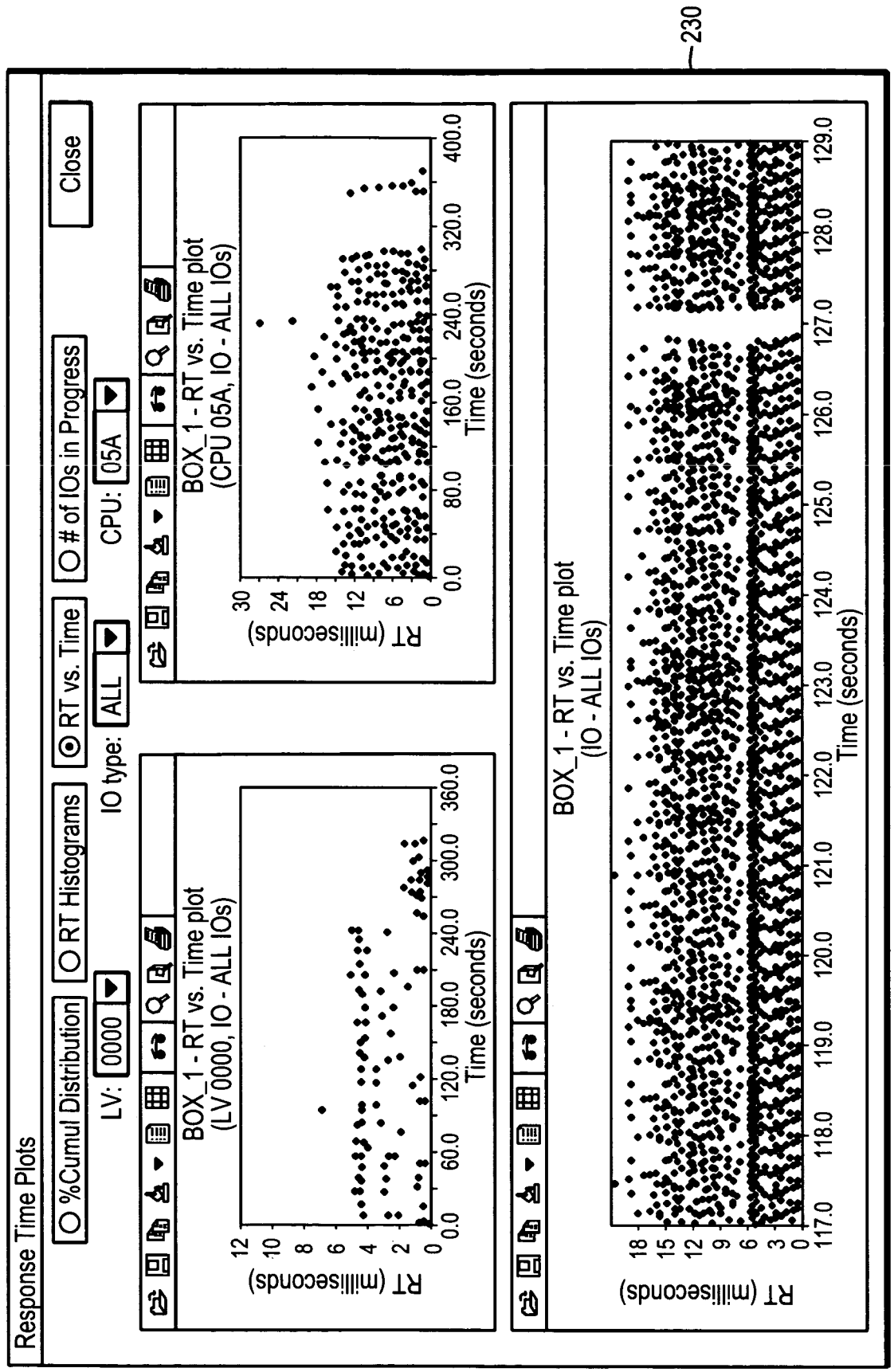
FIG. 14 shows another chart presented on a user screen for analysis of response times of IO ("I/O") activity at component or data storage system level.

FIG. 14 shows another chart presented on a user screen 230 for analysis of response times of IO activity at component or data storage system level. This chart shows the response time of individual IO's versus elapsed time at the LV, director and the system level. Every dot in the chart is an IO, reads and writes are each marked differently. The users may change this chart to show: all IO types (read, write etc); only Reads; and/or only Writes. Also, users may select different LVs and directors from the pull down boxes.

Figure 15:
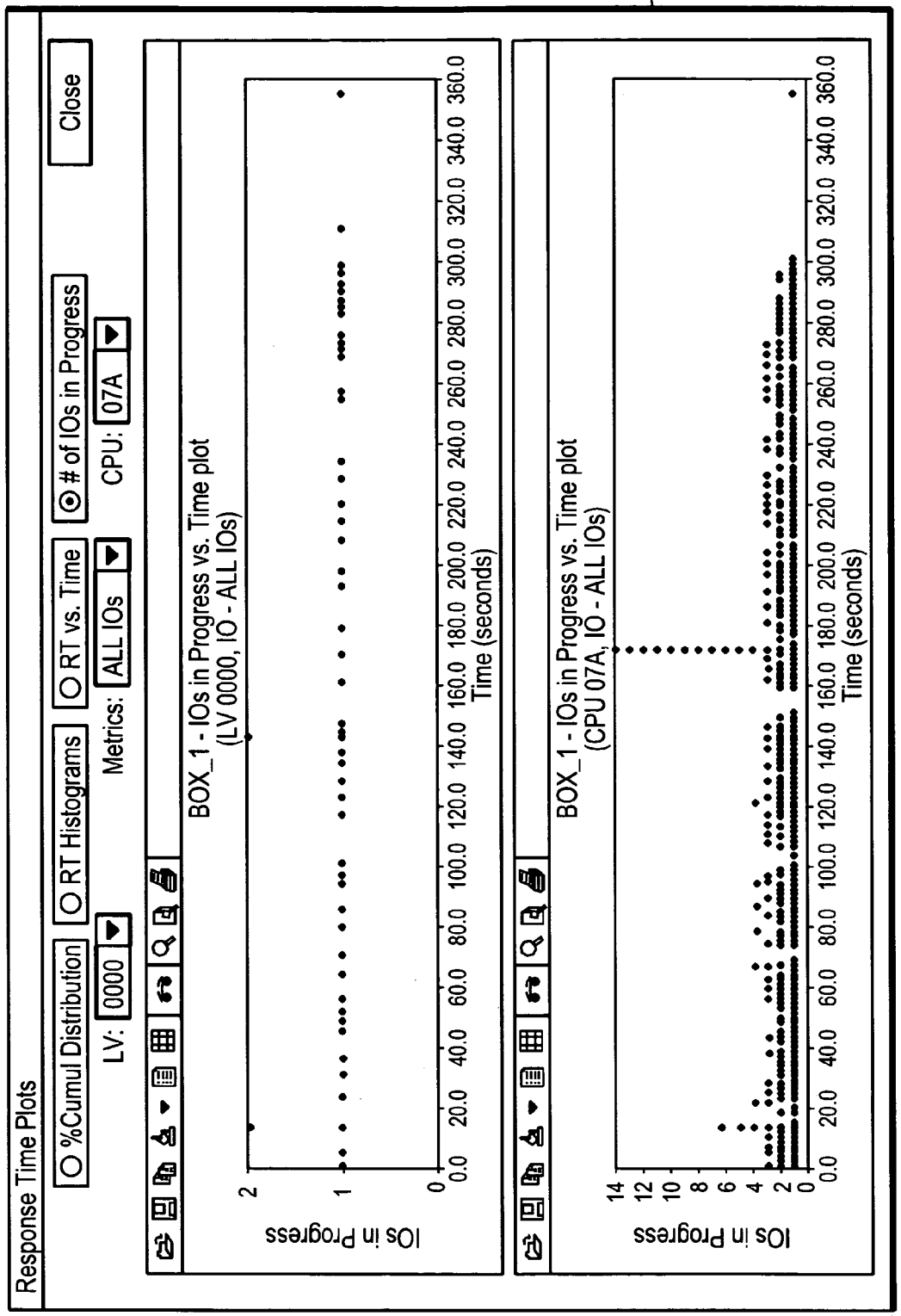
FIG. 15 shows a chart of active IO's in a data storage system presented on a user screen.

FIG. 15 shows a chart on user screen 232 of active IO's in a data storage system presented on a user screen. This chart shows the number of active IO's in the system when a new IO arrives. The larger this number is, the more chance that an IO will take complete. Every dot in the chart shows arrival time of an IO in x-axis, and the number of IO's in progress at LV or director in y-axis. Reads and writes are marked differently. Users may select different LVs and directors from the pull down boxes.

Figure 16:
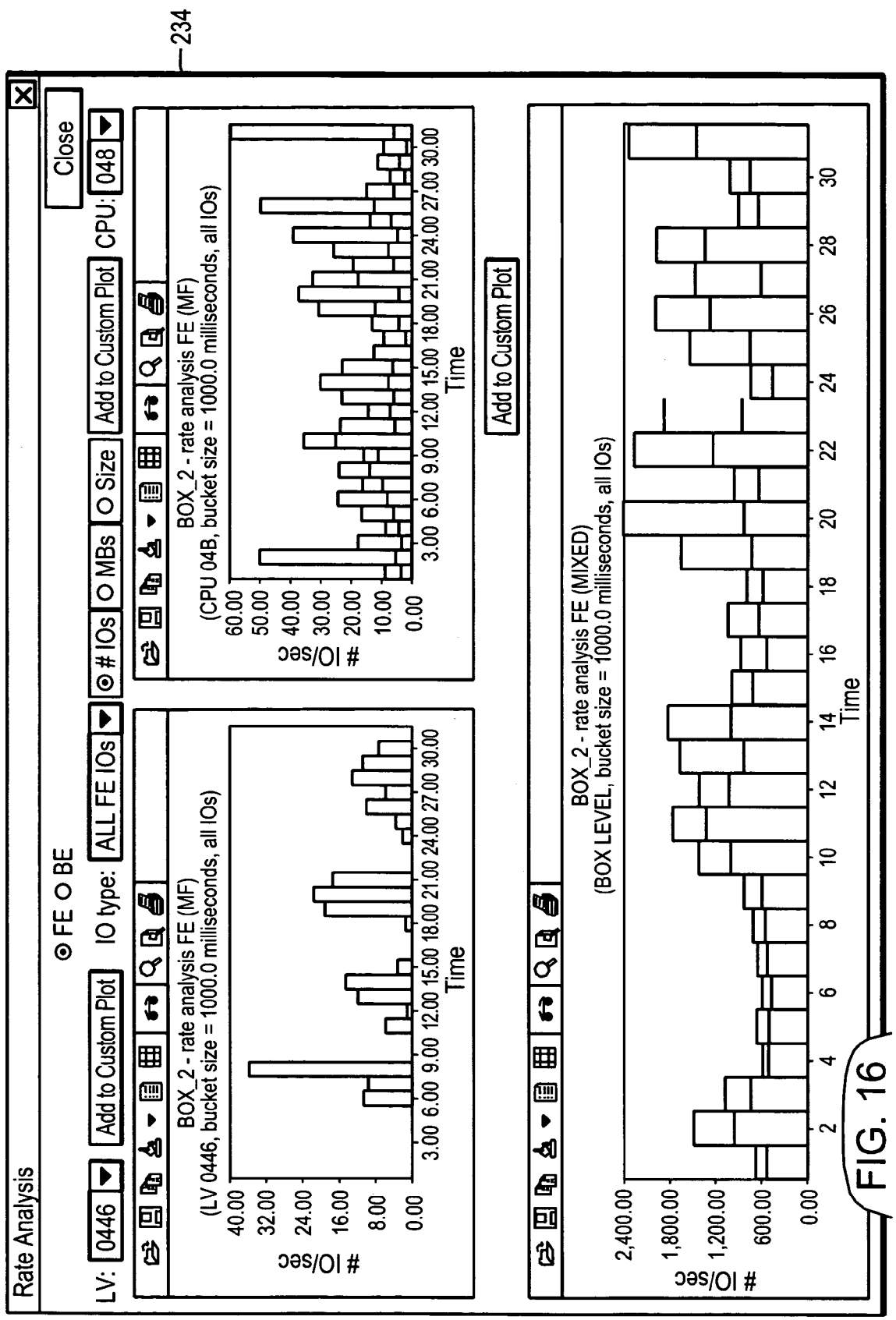
FIG. 16 shows a plot of IO rates in a data storage system presented on a user screen.

FIG. 16 shows on user screen 234 IO rates for a data storage system, short handedly referred to as a box. The information about component trace information is stored in a specially designated for this file (for example, lv_buck_00DA.txt.—contains information for logical volume 00DA). It gives opportunity to plot IO rates in a very fast manner for any component for selected bucket size and for the whole box level as presented in FIG. 3.

Figure 17:
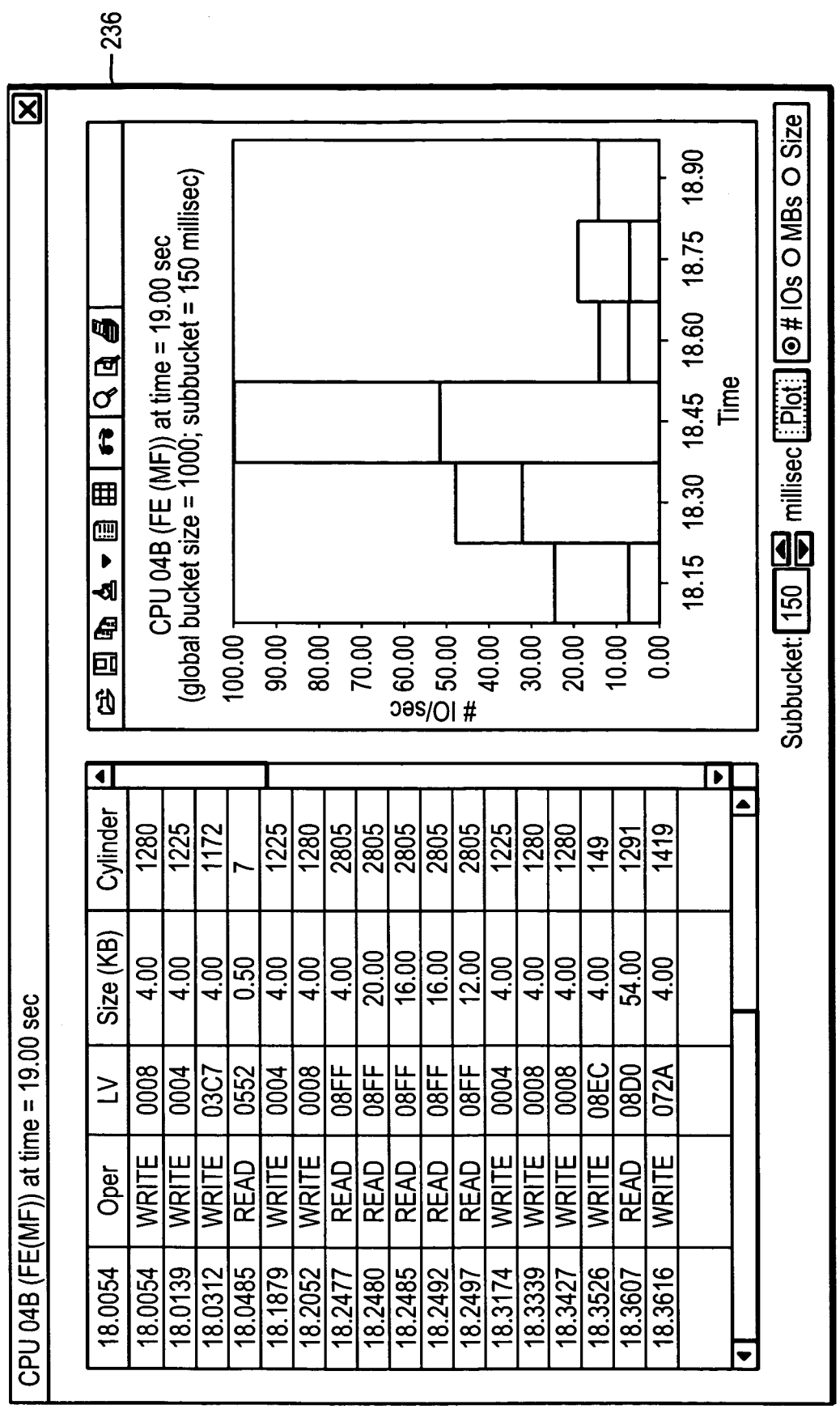
FIG. 17 shows a plot of IO information by component and presented on a user screen.

FIG. 17 shows on user screen 236 a split view by components of raw captured trace data. Keeping the information divided by components raw data from original trace gives a user an opportunity to access law level raw information for any timestamp. It is implemented in the following way: selecting a timestamp of interest and obtaining the corresponding raw data that maybe previewed in a table form and compartmentalized for any bucket size different from the original one Such approach provides very convenient way to investigate bursts.

Figure 18:
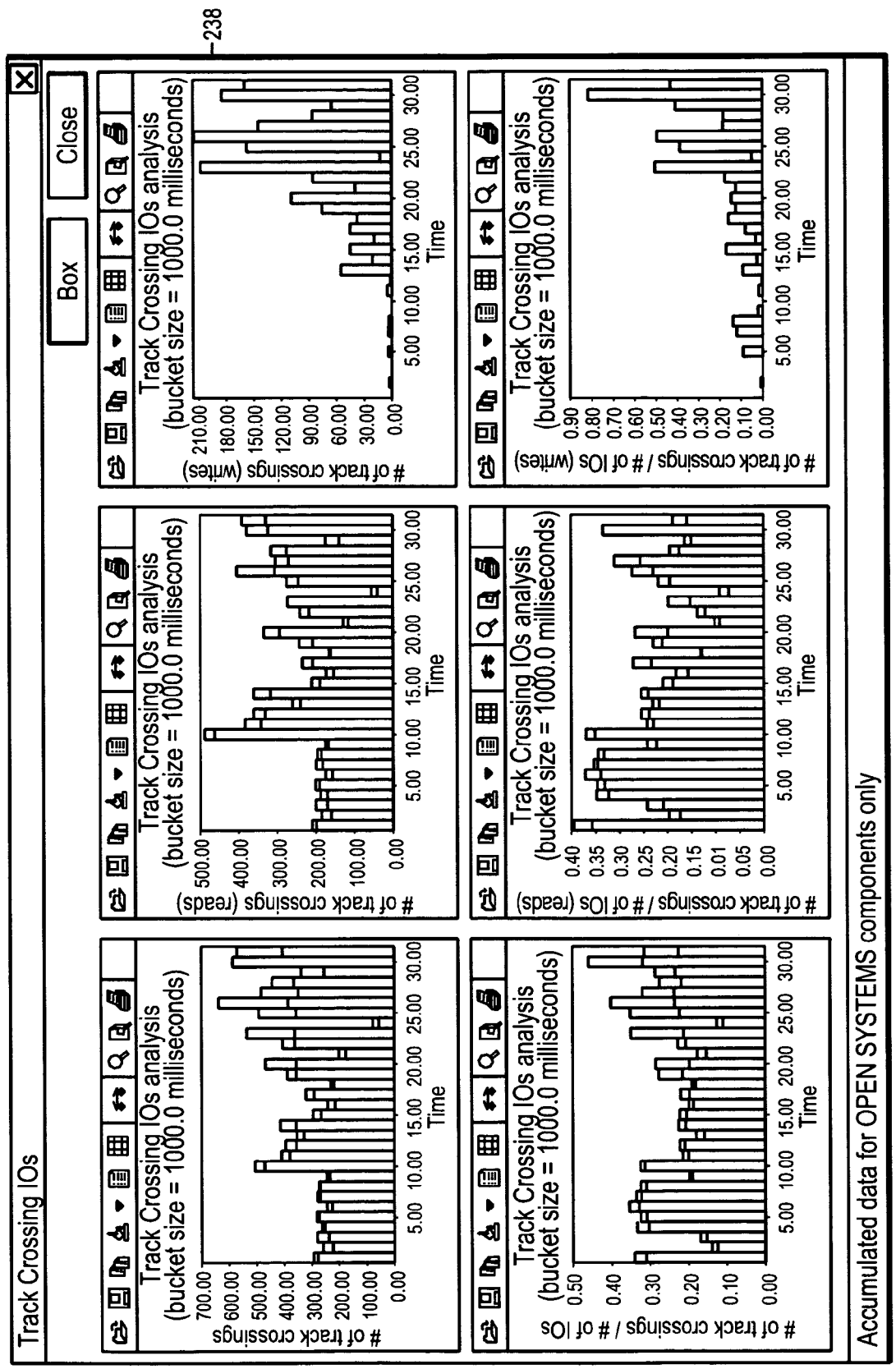
FIG. 18 shows analysis data by component and presented on a user screen.
Figure 19:
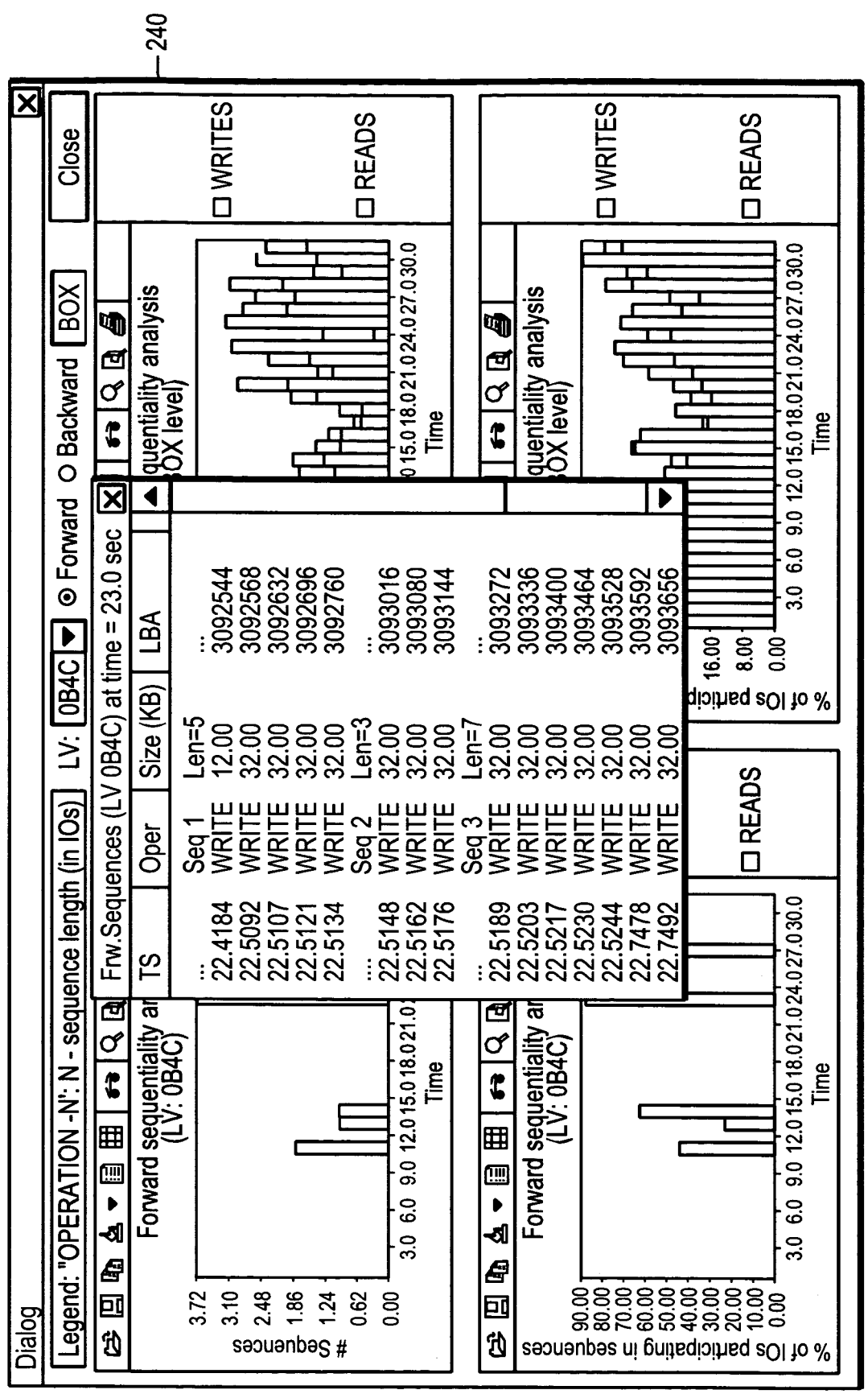
FIG. 19 shows more analysis data by component and presented on a user screen.
Figure 20:
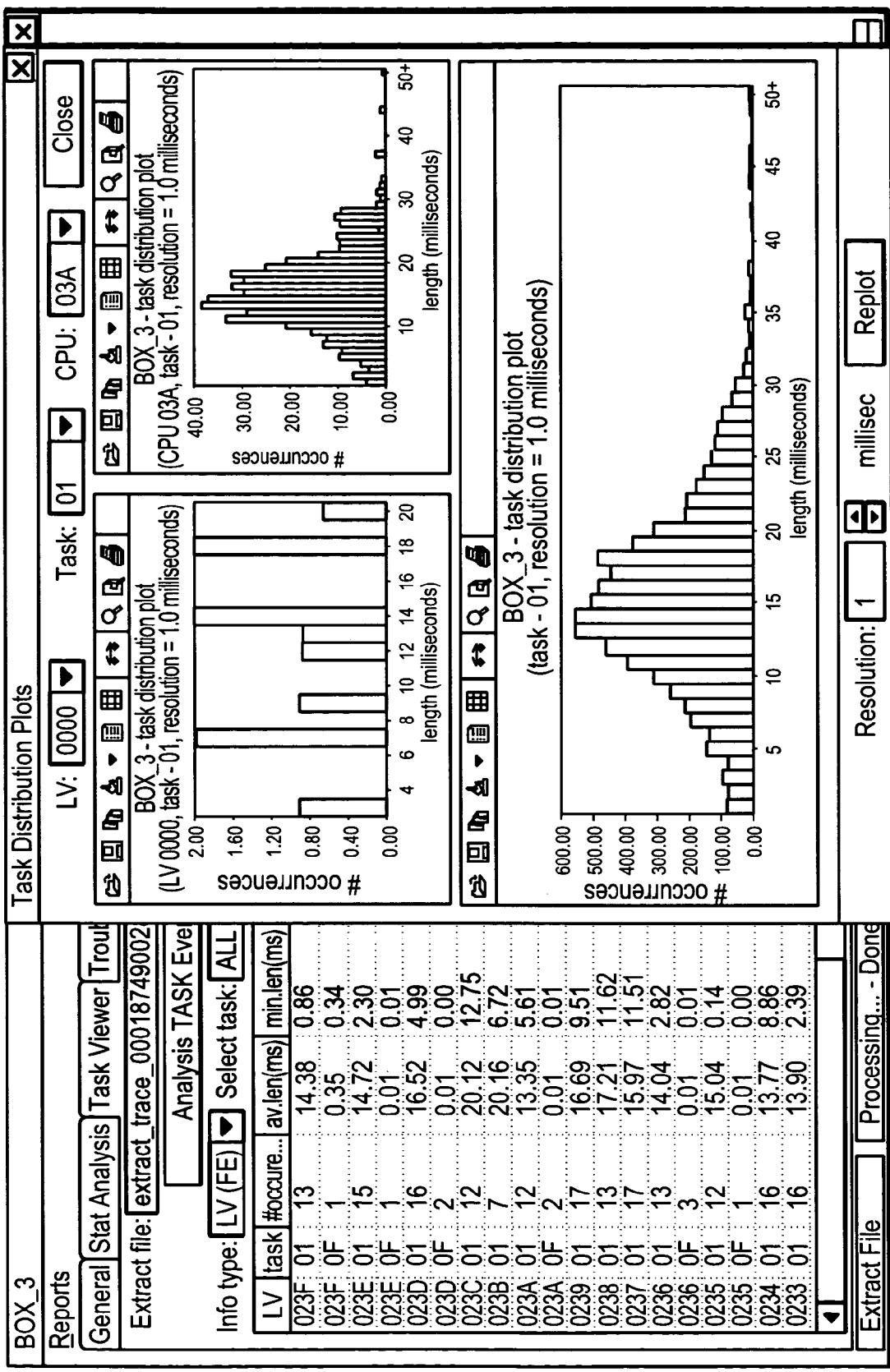
FIG. 20 shows more analysis data by component and presented on a user screen.
Figure 21:
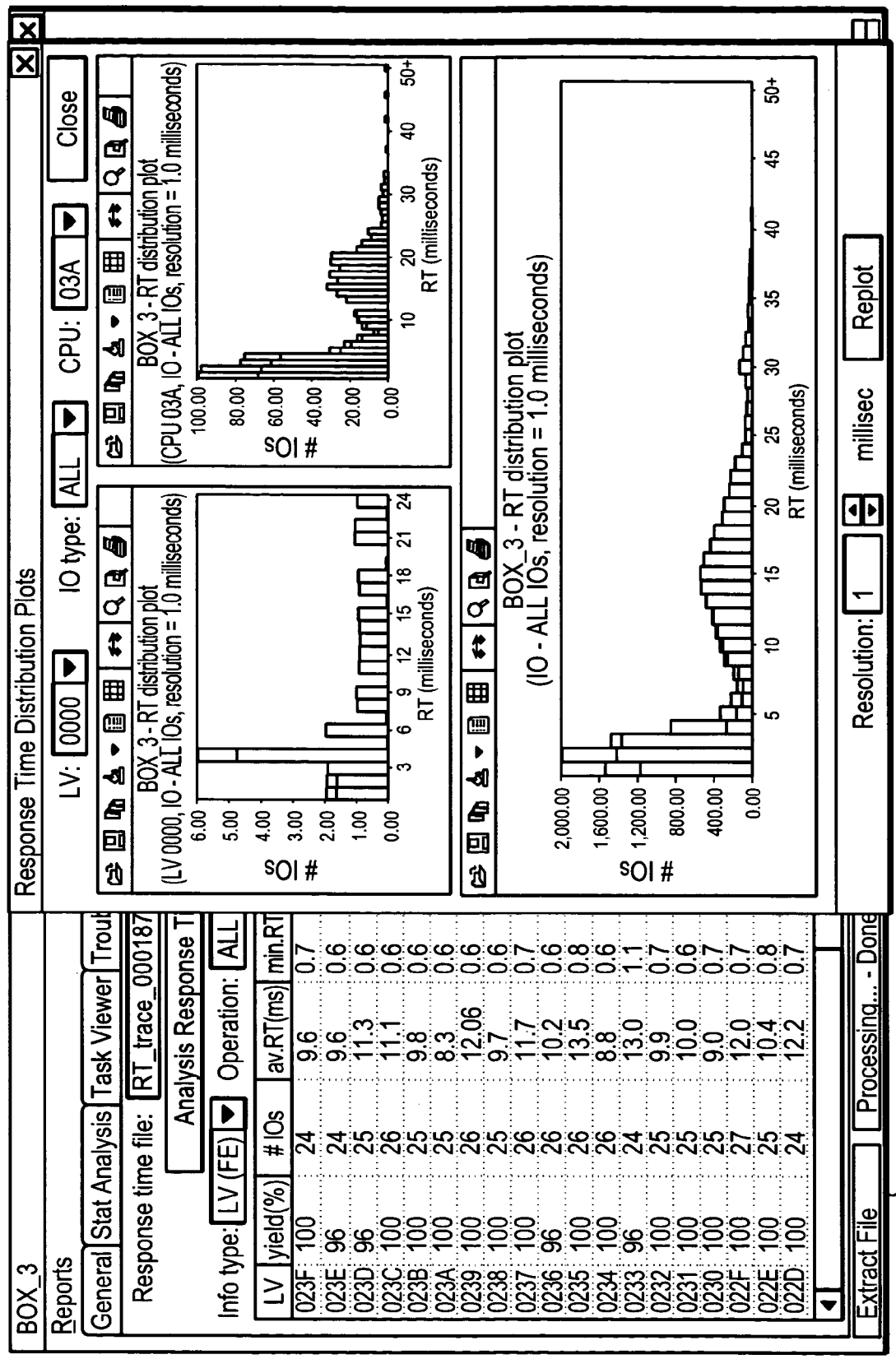
FIG. 21 shows more analysis data by component and presented on a user screen.

FIGS. 18–21 are discussed below. The similar approaches of multiple scanning and component file splitting can be used for investigation of trace misalignment, forward and backward sequentialities, analyzing task events, and also analyzing response times. The corresponding analysis data is kept in designated buckets for component level files. FIG. 18 shows on user screen 238 misalignment data by component. FIG. 19 shows on user screen 240 sequentiality data by component. FIG. 20 shows on user screen 242 task events by box and components and FIG. 21 shows on user screen 244 response times, also by box or component.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for preparing a captured trace, the captured trace being stored for later use, of I/O workload activity experienced on one or more data storage volumes included with a data storage system for being analyzed by a computerized trace analysis process, the method comprising the steps of:

preparing the captured trace for being analyzed by categorizing information from the captured trace into categories related to (i) components in the data storage system experiencing the traced workload activity and (ii) information type including response times and task events;

using the categories for access to trace-related information for trace analysis by the computerized trace analysis process; and presenting the categorized trace-related information on a user screen.

2. The method of claim 1, wherein a summary file summarizing the captured trace is created including the categories information and the summary file is used for the access to trace-related information by the computerized trace analysis process.

3. The method of claim 2, the method of claim 1, wherein the category of information type includes I/O activity.

4. The method of claim 2, wherein the category of components includes logical volume representation of the data storage volumes.

5. The method of claim 2, wherein the computerized trace analysis process includes communication to the trace capture process for being responsive to the act of a trace being captured.

6. The method of claim 2, wherein the computerized trace analysis process includes communication to the trace capture process for being responsive to the act of a trace being captured.

7. The method of claim 1, wherein the category of information type includes I/O activity.

8. The method of claim 1, wherein the category of components includes logical volume representation of the data storage volumes.

9. The method of claim 1, wherein the computerized trace analysis process includes communication to the trace capture process for being responsive to the act of a trace being captured.

10. The method of claim 9, wherein the category of components includes logical volume representation of the data storage volumes.

11. A computer program product available from computer readable medium for preparing a captured trace, the captured trace being stored for later use, of I/O workload activity experienced on one or more data storage volumes included with a data storage system for being analyzed by a computerized trace analysis process, the computer program product when loaded into a computer system, causing the computer system to execute the steps of:

preparing the captured trace for being analyzed by categorizing information from the captured trace into categories related to (i) components in the data storage system experiencing the traced workload activity and (ii) information type including response times and task events;

using the categories for access to trace-related information for trace analysis by the computerized trace analysis process; and presenting the categorized trace-related information on a user screen.

12. The program product of claim 11, wherein a summary file summarizing the captured trace is created including the categories information and the summary file is used for the access to trace-related information by the computerized trace analysis process.

13. The program product of claim 11, wherein the category of information type includes I/O activity.

14. The program product of claim 11, wherein the category of components includes logical volume representation of the data storage volumes.

15. The program product of claim 11, wherein the computerized trace analysis process includes communication to the trace capture process for being responsive to the act of a trace being captured.

16. A system for preparing a captured trace, the captured trace being stored for later use, of I/O workload activity experienced on one or more data storage volumes included with a data storage system for being analyzed by a computerized trace analysis process, the system including:

a data storage system including one or more data storage volumes;

a computer in communication with the data storage system including program logic for carrying out the computer-executed steps of:

preparing the captured trace for being analyzed by categorizing information from the captured trace into categories related to (i) components in the data storage system experiencing the traced workload activity and (ii) information type including response times and task events;

using the categories for access to trace-related information for trace analysis by the computerized trace analysis process; and presenting the categorized trace-related information on a user screen.

17. The system of claim 16, wherein a summary file summarizing the captured trace is created including the categories information and the summary file is used for the access to trace-related information by the computerized trace analysis process.

18. The system of claim 16, wherein the category of information type includes I/O activity.

19. The system of claim 16, wherein the category of components includes logical volume representation of the data storage volumes.

20. The system of claim 16, wherein the computerized trace analysis process includes communication to the trace capture process for being responsive to the act of a trace being captured.

* * * * *